US006721609B1

(12) United States Patent
Wojsznis et al.

(10) Patent No.: US 6,721,609 B1
(45) Date of Patent: Apr. 13, 2004

(54) INTEGRATED OPTIMAL MODEL PREDICTIVE CONTROL IN A PROCESS CONTROL SYSTEM

(75) Inventors: Wilhelm K. Wojsznis, Round Rock, TX (US); Terrence L. Blevins, Round Rock, TX (US); Richard C. Seeman, Georgetown, TX (US); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 680 days.

(21) Appl. No.: 09/593,327

(22) Filed: Jun. 14, 2000

(51) Int. Cl.[7] .............................................. G05B 13/02
(52) U.S. Cl. ............................. 700/28; 700/33; 700/44; 700/55; 700/53; 700/54
(58) Field of Search .................... 700/53, 54, 32, 700/28, 33, 44, 45, 29, 30, 31

(56) References Cited

U.S. PATENT DOCUMENTS

| 4,358,822 A |   | 11/1982 | Sanchez |           |
|-------------|---|---------|---------|-----------|
| 4,983,898 A | * | 1/1991  | Kanda   | .. 700/37 |
| 5,175,678 A | * | 12/1992 | Frerichs et al. | .. 700/47 |

(List continued on next page.)

FOREIGN PATENT DOCUMENTS

GB             2355545 A        4/2001

OTHER PUBLICATIONS

Search report issued in Great Britain application No. GB 0114496.3, dated Sep. 6, 2001.
Hoffman et al., "Model Predictive Control: Future Requirements and Trends," ISA, 1993, Paper #93–369, pp. 1241–1247 (Oct. 1993).
Froisy, "Model Predictive Control: Past, Present and Future," *33 ISA Transactions* pp. 235–243 (1994).
McMillan, "Process Control Optimization," slides entitled "Breaking Into Model Based Control" presented at *Fisher–Rosemount Systems Advanced Control Seminar*, San Antonio (Nov. 1997).
Qin et al., "An Overview of Industrial Model Predictive Control Technology," AIChE Conference, pp. 1–31 (1996).
Edgar et al., "Optimization of Chemical Processes," Chapter 7, *McGraw–Hill, Inc.*, pp. 251–298 (1988).
Wilhelm et al., "Advanced Process Control In Record Time," Control Magazine Software and Information Systems (May 1999).
Provisional application No. 60/132,780, dated May 6, 1999, "Integrating Distributed Process Control System Functionality on a Single Computer."
Honeywell Hi–Spec Solutions: "Honeywell's RMPCT—A Breakthrough in Process Control Technology" Frequently Asked Questions. No date.
Brochure entitled "Advanced Control and Optimization, Capturing and Sustaining Maximum Client Benefits" from Aspen Technology, Inc. of Cambridge, MA, copyright 1996.

*Primary Examiner*—Ramesh Patel
(74) *Attorney, Agent, or Firm*—Marshall, Gerstein & Borun LLP (57) ABSTRACT

A model predictive controller having a set of inputs adapted to receive process output signals and further having a set of outputs adapted to supply process input signals to process control devices is configured to perform integrated optimal model predictive control. The controller provides integrated optimal control using a feedback path that couples a selected output to an input having a setpoint that is equal to the constraint limit of the selected output. The controller maintains the selected output at its constraint limit until one of the outputs, other than the selected output, is going to reach or exceed the associated constraint limit for that output. When the output is going to reach or exceed the associated constraint limit for that output, the controller relaxes the setpoint until the output is no longer going to reach or exceed the associated constraint limit for that output.

29 Claims, 5 Drawing Sheets

U.S. PATENT DOCUMENTS

| | | |
|---|---|---|
| 5,268,835 A | 12/1993 | Miyagaki et al. |
| 5,283,729 A | 2/1994 | Lloyd |
| 5,301,101 A | 4/1994 | MacArthur et al. |
| 5,347,446 A | 9/1994 | Iino et al. |
| 5,351,184 A | 9/1994 | Lu et al. |
| 5,353,207 A | 10/1994 | Keeler et al. |
| 5,386,373 A | 1/1995 | Keeler et al. |
| 5,408,406 A | 4/1995 | Mathur et al. |
| 5,457,625 A | 10/1995 | Lim et al. |
| 5,477,449 A | 12/1995 | Iino |
| 5,517,424 A | 5/1996 | Marcelle et al. |
| 5,539,638 A | 7/1996 | Keeler et al. |
| 5,548,528 A | 8/1996 | Keeler et al. |
| 5,559,690 A | 9/1996 | Keeler et al. |
| 5,566,065 A * | 10/1996 | Hansen et al. ............... 700/44 |
| 5,572,420 A | 11/1996 | Lu |
| 5,586,221 A | 12/1996 | Isik et al. |
| 5,587,896 A * | 12/1996 | Hansen et al. ............... 700/28 |
| 5,587,897 A | 12/1996 | Iida |
| 5,594,858 A | 1/1997 | Blevins |
| 5,614,801 A * | 3/1997 | Miramonti ............... 700/33 |
| 5,659,467 A | 8/1997 | Vickers |
| 5,659,667 A | 8/1997 | Buescher et al. |
| 5,680,409 A | 10/1997 | Qin et al. |
| 5,682,317 A | 10/1997 | Keeler et al. |
| 5,704,011 A | 12/1997 | Hansen et al. |
| 5,740,033 A | 4/1998 | Wassick et al. |
| 5,748,467 A | 5/1998 | Qin et al. |
| 5,781,432 A | 7/1998 | Keeler et al. |
| 5,825,646 A | 10/1998 | Keeler et al. |
| 5,838,563 A | 11/1998 | Dove et al. |
| 5,841,652 A | 11/1998 | Sanchez |
| 5,859,773 A | 1/1999 | Keeler et al. |
| 5,873,251 A | 2/1999 | Iino |
| 5,920,478 A * | 7/1999 | Ekblad et al. ............... 700/29 |
| 6,064,916 A * | 5/2000 | Yoon ............... 700/44 |
| 6,285,971 B1 * | 9/2001 | Shah et al. ............... 700/38 |
| 6,349,236 B1 * | 2/2002 | Hansen et al. ............... 700/67 |
| 6,424,873 B1 * | 7/2002 | Przybylski ............... 700/42 |
| 6,445,963 B1 * | 9/2002 | Blevins et al. ............... 700/44 |

* cited by examiner

INTEGRATED OPTIMAL MODEL PREDICTIVE CONTROL IN A PROCESS CONTROL SYSTEM

FIELD OF THE INVENTION

The present invention relates generally to process control systems and, more particularly, to optimizing the use of a model predictive controller in a process control system.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, like executing a proportional-integral-derivative (PID) control routine. The different function blocks within a process control system are configured to communicate with each other (e.g., over a bus) to form one or more process control loops, the individual operations of which are spread throughout the process and are, thus, decentralized.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single output used to control a single process input, such as a valve position, etc. However, in certain cases, the use of a number of independently operating, single-input/single-output control loops is not very effective because the process variables being controlled are affected by more than a single process input and, in fact, each process input may affect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby affecting the temperature and causing the temperature control loop to take some other action. As will be understood in this example, the single-input/single-output control loops cause the process outputs (in this case, throughput, temperature and pressure) to behave in an unacceptable manner wherein the outputs oscillate without ever reaching a steady state condition.

Model predictive control or other types of advanced control are used to perform control in these types of situations wherein controlled process variables affect more than one process input and wherein each process input affects more than one process output. Generally, model predictive control is a multiple-input/multiple output control strategy in which the effects of changing each of a number of process inputs on each of a number of process outputs is measured and these measured responses are then used to create a model of the process. The model of the process is inverted mathematically and is then used as a multiple-input/multiple-output controller to control the process outputs based on changes made to the process inputs. In some cases, the process model includes a process output response curve for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," *AIChE Conference*, 1996.

Model predictive control may further be used to optimize a selected process input variable such that the process is controlled to maximize and/or minimize the variable selected for optimization. Process input variables that are selected for optimization may include, for example, the process input variables that have the greatest impact on improving the economic value of the process (e.g. process throughput), or the variables that have the greatest impact on improving the quality of the process output. Typically, it is desirable to maximize process throughput and product value and to minimize raw material cost.

In the course of optimizing, a user or an operator generally designates a process input variable to be optimized and determines an optimal process operating point where the designated process input variable is optimized. Of course, the optimal process operating point must also coincide with a process operating point that allows a desired process outcome to be achieved. To achieve the desired process outcome, one or more process output variables must be maintained at predetermined levels or settings, also referred to as setpoints. The process output variables are maintained at their respective setpoints by the proper adjustment of a set of process input variables. Unfortunately, optimal process control is more complex than simply operating the process at the optimal process operating point because the optimal process operating point typically exists at the limits of the process operation. More particularly, each of the process input variables has a physical constraint limit and if, while operating at the optimal process operating point, two or more of the process input variables reach or exceed a physical constraint limit associated therewith, then the process will enter into an undesirable state wherein the process controller will be unable to maintain the process output variables at their respective setpoints. However, as described above, the optimal process operating point involves operating the designated optimal process input variable at its maximum (or minimum) setting which is typically equal to its physical constraint limit. Thus, while operating at the optimal process operating point, one of the process input variables is already at its physical constraint limit such that if even one of the other process input variables reaches or exceeds its physical constraint limit, then the process enters the undesirable state wherein the controller is unable to maintain the process output variables at their respective setpoints. As a result, in addition to operating at the optimal process operating point, process optimization further requires monitoring the process input variables and taking action to prevent them from reaching or exceeding their constraint limits.

Conventional optimization control algorithms monitor the process variables while the process is operating to identify when one or more of the constraint limits is being approached. Preventative action, such as adjusting a process input, is then taken to avoid violating the constraint limit that is being approached. In a conventional control system, decision making about whether preventative action is required must be more conservative because the data upon which this decision making is based is real-time process data to which there is little time to react. As a result, the process must operate farther from the desired or optimized constraint limits, which compromises the degree of optimization achieved by the process. Moreover, preventative action is not always necessary every time a process variable approaches a constraint limit because, in some instances, even without preventative action, the constraint limit will not actually be violated. However, in conventional control systems, the collection of real-time process data does not afford insight as to whether the constraint limit that is being approached will actually be violated. Therefore, every constraint limit approach must be treated as a potential violation and preventative action must be taken. As a result, at least some of the preventative actions are undertaken unnecessarily which also causes optimization to be comprised unnecessarily.

In addition, existing control systems that offer optimized control, typically use a separate optimization control algorithm to achieve the optimization. The need for a separate optimization control algorithm increases the complexity of the overall control scheme and increases the complexity of the control apparatus needed to achieve the overall control scheme.

SUMMARY OF THE INVENTION

The present invention is directed to a multi-input/multi-output logic controller for controlling a process, wherein each controller input is adapted to receive a process output signal and wherein each controller output is adapted to provide a process control signal to a process control device. To enable optimal control of the process, a a selected one of the controller outputs is coupled to a further controller input having an associated setpoint and the controller uses the associated setpoint to maintain the selected controller output at its constraint limit.

According to one aspect of the invention, a multi-input/multi-output logic device includes a plurality of inputs that are adapted to receive process output signals, a further input having an associated setpoint, and a multiplicity of outputs that are adapted to provide process control signals for controlling a process. The logic device further includes a feedback path that connects a selected one of the outputs to the further input and a logic unit, such as a model predictive controller or a fuzzy logic controller, that is configured to produce the multiplicity of outputs using the plurality of inputs and the further input. The logic unit is adapted to adjust the selected output until the further input has reached the associated setpoint which may be set equal to a constraint limit of the selected output.

According to a further aspect of the invention, a multiplicity of the outputs may have an associated constraint limit and the logic unit of the logic device may include a setpoint adjustment unit that adjusts the setpoint from a first setpoint setting to a second setpoint setting when one of the outputs, other than the selected output, is going to reach or exceed the associated constraint limit for that output. The first setpoint setting may correspond to the constraint limit of the selected output and the second setpoint setting may correspond to a value that is relaxed with respect to the constraint limit of the selected output.

According to a still further aspect of the invention, the setpoint adjustment unit may be further adapted to adjust the setpoint from the second setpoint setting to the first setpoint setting when the one of the outputs is no longer going to reach or exceed the associated constraint limit for that output.

According to yet another aspect of the invention, the logic device may further include a prediction unit that predicts a future value for each of the outputs, other than the selected output, and a comparison unit that compares the future value for each of the multiplicity of outputs to the constraint limit associated with that output to determine whether any one of the outputs, other than the selected output, is going to reach or exceed the associated constraint limit for that output.

According to a further aspect of the invention, a method for controlling a process uses a multi-input/multi-output logic device that has a plurality of inputs adapted to receive process output signals and a multiplicity of outputs, each having an associated constraint limit, adapted to provide process control signals for controlling the process. The method includes the steps of connecting a selected one of the outputs to a further input of the logic device, setting a setpoint that is associated with the further input to a first setpoint setting and adjusting the selected output until the further input has reached the first setpoint setting. The method further includes the steps of calculating a future value for each of the multiplicity of outputs, other than the selected output, comparing the future value calculated for each output to a constraint limit associated with the output to determine whether any one of the outputs, other than the selected output, is going to reach or exceed the associated constraint limit for that output. The step of adjusting the setpoint from the first setpoint setting to a second setpoint setting is performed when one of the outputs, other than the selected output, is going to reach or exceed the associated constraint limit for that output.

According to yet another aspect of the invention, the method may further include the step of adjusting the setpoint from the second setpoint to the first setpoint when the step of comparing determines that the one of the outputs is no longer to going to reach or exceed the associated constraint limit for that output.

DESCRIPTION OF THE PREFERRED EMBODIMENTS

Figure 1:
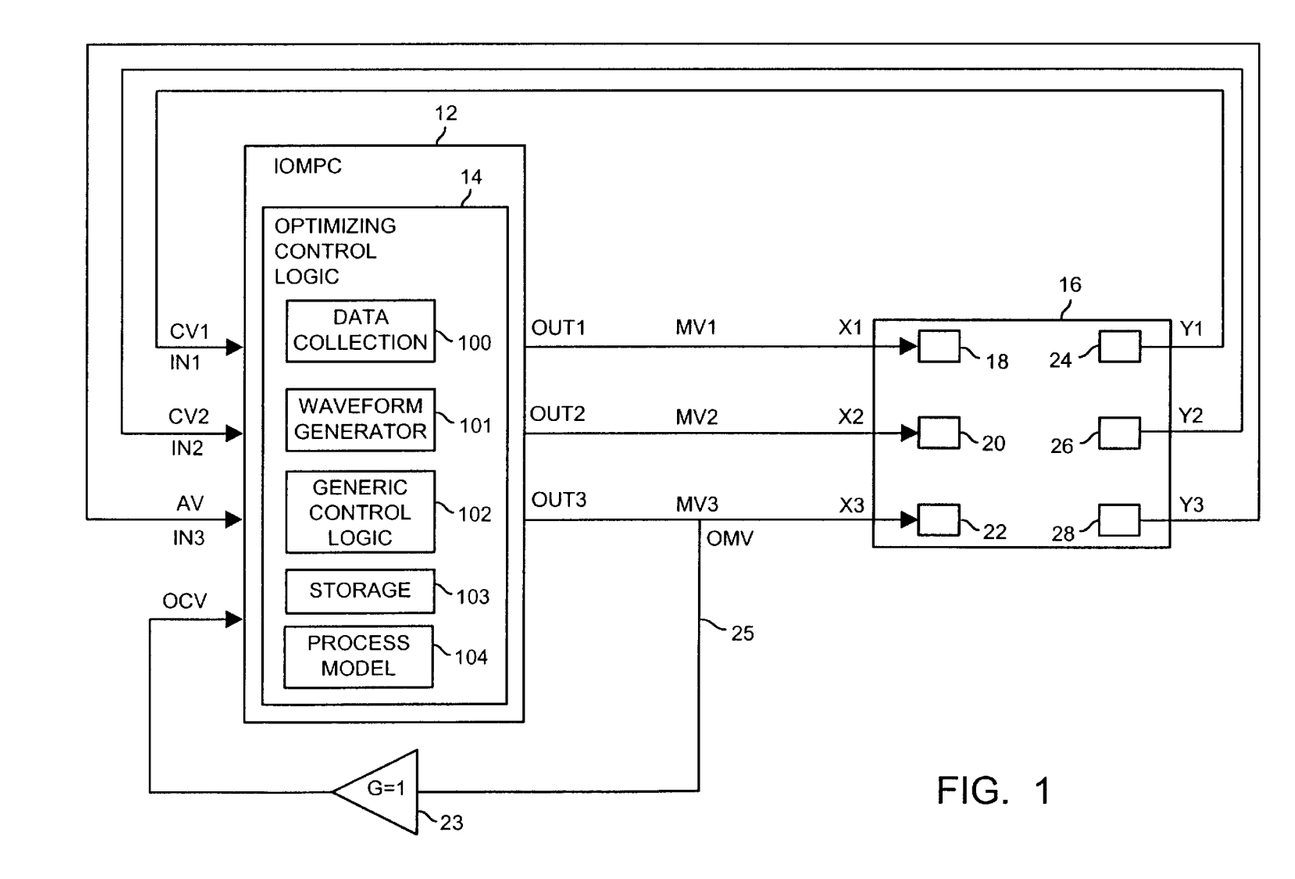
FIG. 1 is a block diagram of an integrated optimal model predictive controller configured to operate to control a process.

Referring now to FIG. 1, a process control system 10 represented in block diagram format includes an integrated optimal model predictive controller ("IOMPC") 12 that executes an optimizing control logic 14 that may be embodied, for example, with a software routine for performing optimal model predictive control. The IOMPC 12 executes the optimizing control logic 14 to operate as a multi-input/multi-output logic device that is configured to control a process 16 and, more particularly, to operate a set of process control devices 18, 20, 22 which may be implemented using, for example, valves, positioners, etc, in a manner that causes the process 16 to respond in a desired manner so that a desired process outcome is achieved. To determine whether the process 16 is responding in the desired manner, the process 16 is monitored with a set of measuring devices 24, 26 and 28 that may be implemented using, for example, temperature sensors, level sensors, etc. In accordance with conventional model predictive control terminology, the process control devices 18, 20 and 22 are used to control process variables, referred to herein as manipulated variables MV1, MV2 and MV3, respectively, because they are adjusted or manipulated by the IOMPC 12. The measuring devices 24 and 26 are used to measure a set of process variables that are referred to herein as control variables, CV1 and CV2, respectively, because the objective of the process control system 10 is to control these variables such that the desired process outcome may be achieved. The measuring device 28 may be used to measure a process variable that is referred to herein as an auxiliary variable AV because, although the monitoring of this variable is essential to proper process operation, maintaining the AV at a specific setting is not essential to achieve the desired process outcome. To enable integrated optimal control of the process 16 in a manner that is described in more detail below, the manipulated variable MV3, in addition to being adapted to provide control signals to the control device 22, is further coupled via a feedback path 25 to an input of the IOMPC 12 referred to as an optimized control variable ("OCV").

Figure 2:
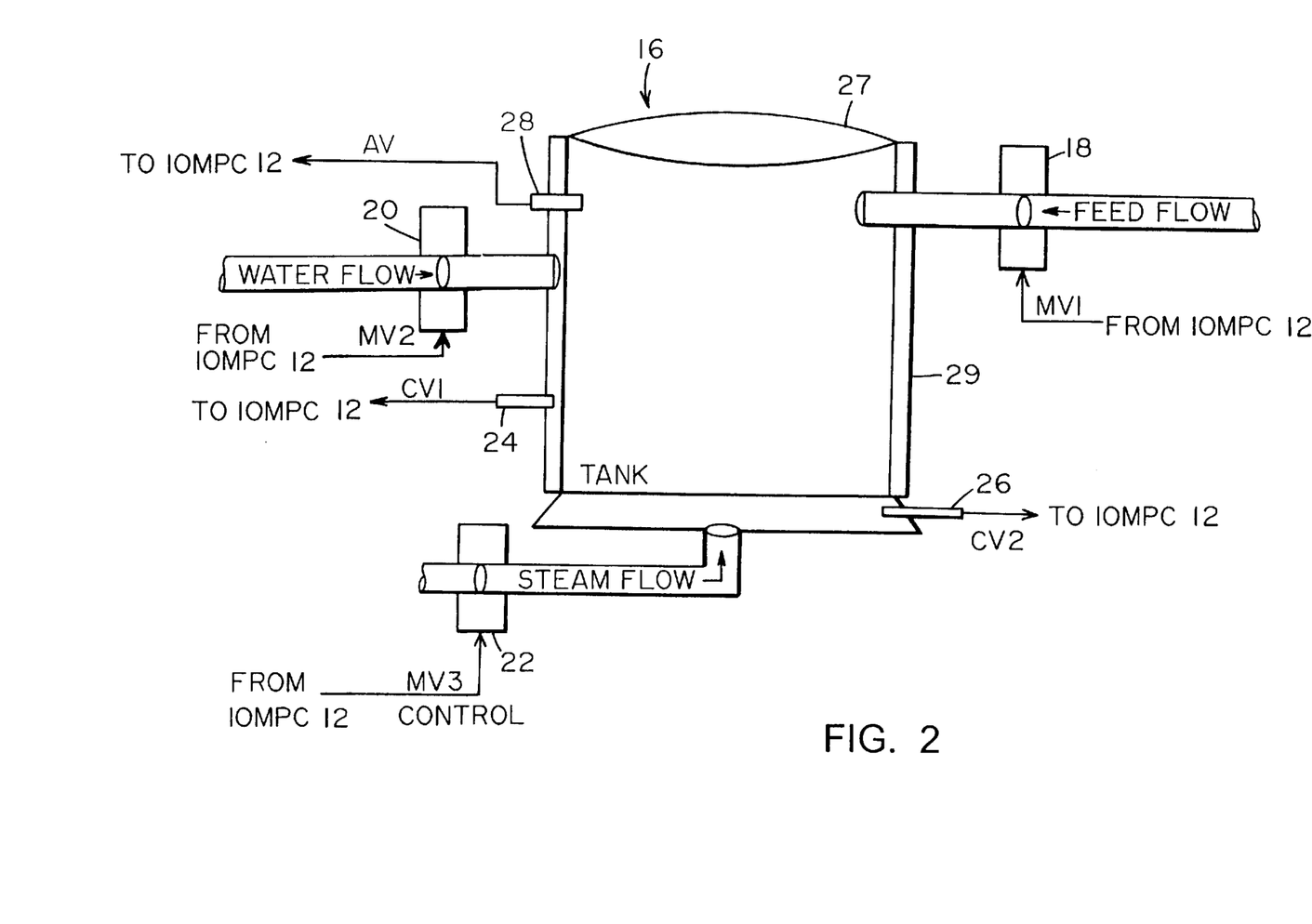
FIG. 2 is a diagram of an exemplary simple chemical reaction process controlled by the integrated optimal model predictive controller of FIG. 1.

Referring now to FIG. 2, the process 16 that the IOMPC 12 is configured to control is described, for illustrative purposes, as a simple chemical reaction process wherein a chemical feed material is fed into a tank 27 or other suitable container and is maintained at a desired temperature. The flow of the feed material into the tank 27 is controlled with the process control device 18 implemented as a feed flow valve. The flow rate through the feed flow valve 18 is defined as the manipulated variable, MV1. A heat source (not shown) generates steam that is delivered to the tank 27 via the device 22, which may be implemented using, for example, a steam flow control valve 22, and that causes the temperature of the feed material to rise. To further control the temperature of the chemical feed material, cooling water is supplied to a sleeve 29 that surrounds the tank 27. The flow of water into the sleeve 29 is controlled with the process control device 20 which is implemented as a water flow control valve 20. The rate of water flow through the water flow valve 20 and the rate of the steam flow through the steam flow valve 22 are designated as the manipulated variables MV2 and MV3, respectively. The temperature of the water is measured using the measuring device 24 which is implemented as a liquid temperature sensor 24 that provides a temperature measurement to the IOMPC 12. The steam temperature is measured using the measuring device 26 which is implemented as a vapor temperature sensor 26 that provides a vapor temperature measurement to the IOMPC 12. The temperatures measured by the temperature sensors 24 and 26 are defined as the control variables CV1 and CV2 and are, therefore, controlled to specific, predetermined temperatures to ensure that the desired process outcome, i.e., maintaining the chemical feed material at the desired temperature, is achieved.

The level of the liquid in the tank 27 is measured with the measuring device 28 which is implemented as, for example, a level sensor 28 that supplies a level measurement to the IOMPC 12. The level of liquid in the tank 27 is monitored to prevent overfilling the tank 27. More particularly, the volume of the tank 27 into which the chemical feed material is deposited is limited and, if exceeded, will result in tank overflow which may have adverse effects such as, for example, wasted feed material and potential damage to equipment located near the tank 27. The tank level signal generated by the level sensor 28 is designated as the auxiliary variable AV, which must be monitored to ensure proper process operation. To control the process 16, the flow rates through the valves 18, 20 and 22 are adjusted in a manner such that the temperature of the chemical feed material, as measured by the liquid and vapor sensors 24 and 26 is maintained within the predetermined temperature ranges and such that the level of liquid in the tank 27 does not exceed a maximum allowable value. Of course, it should be understood that the process 16 was chosen only for purposes of illustrating the operation of the IOMPC 12. As a result, the IOMPC 12 is not limited to control of a process like the process 16 having two control variables and a single auxiliary variable. In fact, the IOMPC 12 may instead be used to control a process having any number of control variables or auxiliary variables.

The predetermined temperatures at which the liquid and the vapor phases are to be maintained are referred to as setpoints, which may include a discrete temperature or a range of acceptable temperature levels. A setpoint $CV1_{SP}$ associated with the control variable CV1 and a setpoint $CV2_{SP}$ associated with the control variable CV2 represent the temperature level or range of levels at which the water and the steam, respectively, are to be maintained to achieve the desired process outcome.

In addition to adjusting the manipulated variables MV1, MV2 and MV3 in a manner that causes each of the control variables CV1 and CV2 to reach their respective setpoints, the optimizing control logic 14 of the IOMPC 12 is also configured to ensure that each of the manipulated variables MV1, MV2 and MV3 do not exceed or violate a constraint associated therewith. The constraints associated with the manipulated variables MV1, MV2 and MV3 represent the maximum allowable value for that manipulated variable. These constraints are typically physical constraints that may not be exceeded without causing damage to the process 16 or the control system and/or may not be exceeded due to the physical attributes of a controlled device, e.g., a valve can only open so far. The variables $MV1_{CON}$, $MV2_{CON}$ and $MV3_{CON}$ are used to designate the constraints associated with the manipulated variables MV1, MV2 and MV3, respectively, and the constraints $MV1_{CON}$, $MV2_{CON}$ and $MV3_{CON}$ are set equal to the maximum allowable flow rates of the manipulated variables MV1, MV2 and MV3, respectively, i.e., the maximum feed flow rate, water flow rate and steam flow rate. The maximum allowable flow rates $MV1_{CON}$, $MV2_{CON}$ and $MV3_{CON}$ may, if desired correspond to the fully open positions of the valves 18, 20 and 22, respectively. In addition, the constraint for the tank level is designated $AV_{CON}$ and represents the maximum allowable tank level.

Generally, the optimizing control logic 14 of the IOMPC 12 is configured to operate the process 16 at an optimal level wherein a selected process performance characteristic is optimized. Before configuring the IOMPC 12 to operate the process 16 at an optimal level, a performance characteristic, hereinafter referred to as the optimization objective, is selected for optimization. Typically, the optimization objective may include, for example, the rate of production, the cost of production or the quality of production.

In simplistic terms, optimization of a process performance characteristic is achieved by maintaining one of the manipulated variables, hereinafter referred to as the optimized manipulated variable ("OMV") at an optimal setting. The OMV that is selected for optimization is the manipulated variable that is most closely and directly related to the process performance characteristic such that, if the selected manipulated variable is maximized, or in some cases minimized, then the process performance characteristic will be optimized. Preferably the process dynamics and the gain associated with the OMV are also taken into consideration when selecting a manipulated variable for optimization. More particularly, it is desirable that the process dynamics related to the OMV be relatively slower than the dynamics related to the other manipulated variables MV1 and MV2 so as to ensure that the setpoints $CV1_{SP}$ and $CV2_{SP}$ are satisfied sooner than the optimization objective. It is further desirable that the OMV have a relatively strong relationship with all of the control variables CV1 and CV2, i.e., that the process gain associated with the OMV be relatively significant so that small changes or adjustments to the OMV cause relatively significant changes or adjustments to the controlled output variables.

For illustrative purposes, the performance characteristic of the process 16 selected for optimization is the production rate of the process 16, such that the optimization objective is to maximize the production rate or process throughput. It will be assumed for the purpose of this example that the manipulated variable MV3 is the manipulated variable that is most closely and directly related to the production rate and, therefore, the manipulated variable MV3 is hereinafter referred to as the OMV. The optimizing control logic 14 of the IOMPC 12 is configured to optimize the production rate by maximizing the OMV (MV3) which involves maintaining the steam flow valve 18 in a fully open position thereby maximizing the rate of the steam flow and maximizing the throughput of the process 16. Although the optimized process variable (i.e., steam flow rate) selected to illustrate the operation of the IOMPC 12 is associated with an increasing setpoint wherein the optimized process variable is maintained at its maximum setting, the IOMPC12 is not limited to operation with an optimized process variable having an increasing setpoint. The IOMPC 12 may instead may be used to control a process wherein optimal control is performed by maintaining a selected process variable at a minimum level, in which case the variable selected for optimization will have a decreasing setpoint.

Although conventional model predictive controllers are configured to maintain control variables at a designated setpoint, such controllers are not typically configured to monitor and control a manipulated variable at an optimal setting. To maintain the OMV at the optimal setting and thereby achieve optimal process control, the IOMPC 12 is configured to include the OCV coupled to the OMV by the feedback path 25. The feedback path 25, which further has an amplifier 23 having a unit gain, causes the OMV to be related to the OCV by a unit gain. The OCV is also referred to as a shadow control variable because the unit gain relationship between the OCV and the OMV causes the OCV to follow or "shadow" the OMV. A setpoint $OCV_{SP}$ is defined for the OCV and the value of the setpoint is set at the constraint level of the OMV with a small penalty for error. When any of the setpoints including the $OCV_{SP}$ are adjusted, the IOMPC 12 responds to the adjusted setpoint by adjusting the manipulated variables MV1, MV2 and OMV as necessary to satisfy the adjusted setpoint. To satisfy the $OCV_{SP}$, the IOMPC 12 adjusts the OMV until it is equal to the $OMV_{CON}$. Due to the unit gain relationship between the OCV and the OMV, adjusting the OMV in this manner causes the OCV to follow suit. As a result, the OCV may be used to indirectly maintain the OMV at its optimal setting $OMV_{CON}$. It should be understood that, although the gain between OMV and the OCV is preferably a unit gain, any gain may instead be used provided that the optimizing control logic 14 has been programmed to compensate for the gain when making adjustments to the $OCV_{SP}$.

Figure 3:
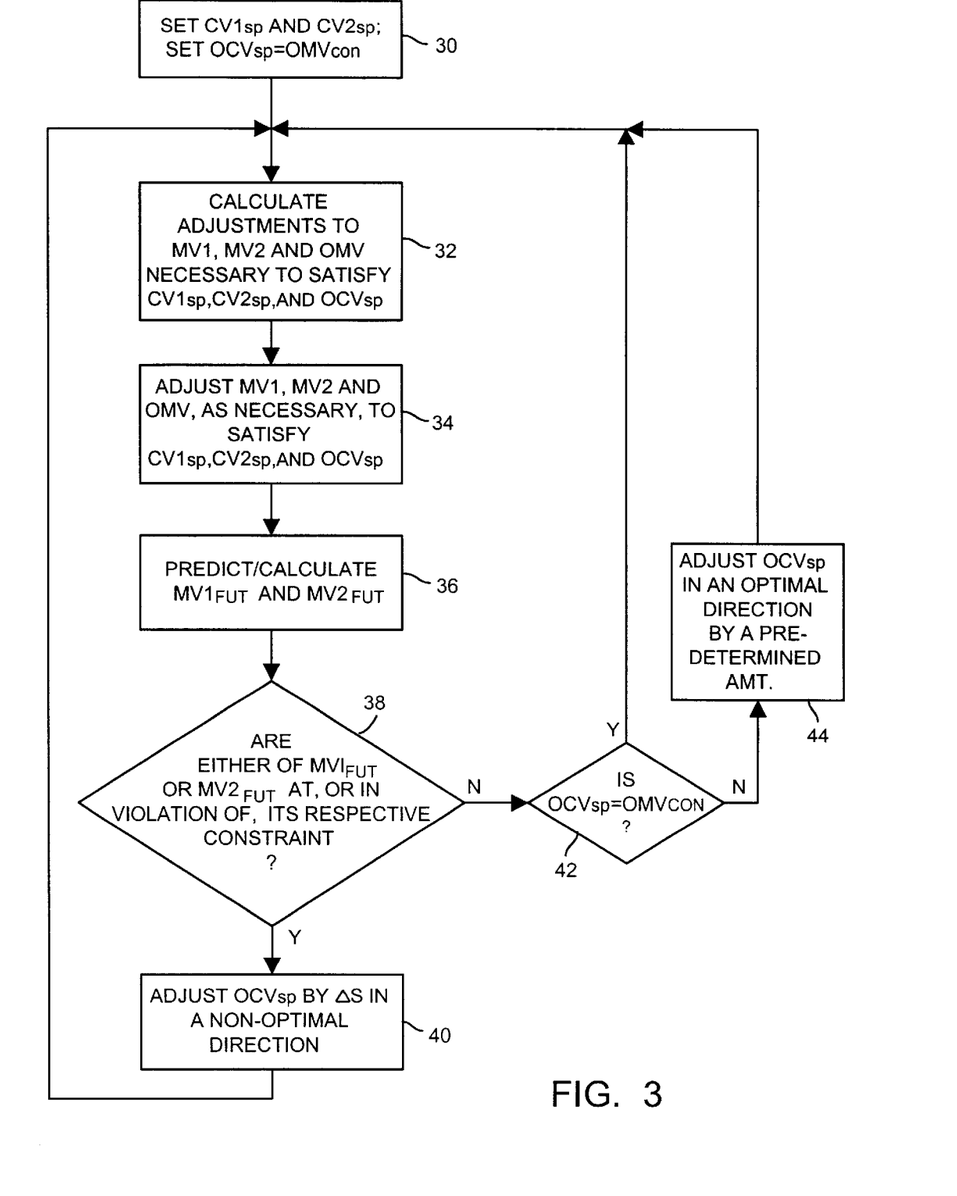
FIG. 3 is a flow diagram illustrating a method of performing integrated optimal model predictive control.

Referring now to FIG. 3, the optimizing control logic 14, when executed by the IOMPC 12, performs an integrated optimizing method, that may be implemented, for example, as a set of software program blocks, and that begins at a block 30. Before the block 30 is executed, it is assumed that the process 16 is in a shutdown mode so that the process control system 10 is not operating. Alternatively, before the block 30 is executed, individual control loops of the process 16 may be under the control of a set of individual, local single loop controllers, such as individual PID controllers (not shown). It should be also understood that before the optimizing method of FIG. 3 is performed, the IOMPC 12 will have been configured in the manner described above, e.g., the OMV will have been coupled to the OCV, and that a model of the process will have been created for use in controlling the process 16. The block 30 sets the setpoints $CV1_{SP}$ and $CV1_{SP}$ equal to levels that are appropriate to properly control the process and sets the $OCV_{SP}$ equal to $OMV_{CON}$. Next, a block 32, calculates the adjustments to the MV1, MV2 and OMV that are necessary to satisfy the control variable setpoints $CV1_{SP}$ and $CV2_{SP}$ and the optimized control variable setpoint $OCV_{SP}$ in the same manner as a conventional model predictive controller. As will be understood by one of ordinary skill in the art, conventional model predictive control involves calculating future process states using a process model and the current process variable information and then using the calculated future process states to make adjustments to the process input variables, wherein the adjustments cause the control variables to reach or remain at their respective setpoints. For example, if the block 32 is attempting to satisfy $CV1_{SP}$ and $CV2_{SP}$, the block 32 uses the process model to define the adjustments to MV1 and MV2 that will cause CV1 and CV2 to reach $CV1_{SP}$ and $CV2_{SP}$, respectively.

Next, a block 34 adjusts MV1, MV2 and OMV using the adjustments calculated at the block 32. It will be understood that adjusting the OMV at the block 34 may cause CV1 and CV2 to depart from their respective setpoints, in which case, MV1 and MV2 may also require further adjustment to ensure that the setpoints $CV1_{SP}$ and $CV2_{SP}$ continue to be satisfied. Of course, due to the coupling of the OMV to the OCV as shown in FIG. 1, adjusting the OMV in a manner that will cause the $OCV_{SP}$ to be satisfied, merely involves adjusting the OMV until the OCV satisfies the $OCV_{SP}$. As a result, the $OCV_{SP}$ is used not only to control the OCV but also to control the OMV. Thus, coupling the OMV to the OCV, enables the IOMPC 12 control of a manipulated variable, i.e., the OMV, in the same manner as it performs control of a control variable, i.e., the OCV, but without need of additional componentry.

After the OCV has reached the $OCV_{SP}$, and MV1 and MV2 have been adjusted as necessary to satisfy $CV1_{SP}$ and $CV2_{SP}$, control continues at a block 36 which uses the manipulated variables and the control variables MV1, MV2, OMV, CV1, CV2 and AV to predict/calculate a set of future values for the manipulated variables MV1 and MV2 designated $MV1_{FUT}$ and $MV2_{FUT}$, respectively. As stated above, conventional model predictive control involves calculating future process states as a matter of course. In particular, conventional model predictive controllers may be configured to compute the future values of the manipulated variables $MV1_{FUT}$ and $MV2_{FUT}$ in any of a number of ways including, for example, 1) by computing the manipulated variable moves over the entire control horizon (i.e., over the number of future manipulated variable moves computed by the model predictive controller); 2) by using an additional MPC controller that is set with a control horizon equal to one so that it may be used to estimate future values of the manipulated variables; or 3) by using a prediction model to determine the effect that changes in the OMV will have on MV1 and MV2.

Next, a block 38 uses the values of $MV1_{FUT}$ and $MV2_{FUT}$ to determine whether the process 16 is going to enter into an undesired state wherein two or more of the manipulated variables are at or are in excess of their respective constraints. This state is undesirable because, while operating in this state, the optimizing control logic 14 will be unable to maintain control of one or more of the control variables CV1 and/or CV2 thereby causing CV1 and/or CV2 to deviate from their respective setpoints. Specifically, while in this undesired state, the optimizing control logic 14 cannot adjust the manipulated variables MV1 and MV2 to cause CV1 and CV2 to reach their respective setpoints without also causing one or more of the manipulated variables MV1, MV2 and/or OMV to violate their respective constraints. Thus, to determine whether the process is going to enter into the undesired state, the values of $MV1_{FUT}$ or $MV2_{FUT}$ are examined to determine whether either is in violation of its respective constraint, thereby causing a constraint violation. Note that, because the process 16 is operating in the optimal mode, the OMV is already at its associated constraint, $OMV_{CON}$. For this reason, it is only necessary that one of either $MV1_{FUT}$ or $MV2_{FUT}$ be in violation of its respective constraint for the process to enter the undesired state. If $MV1_{FUT}$ or $MV2_{FUT}$ is in violation of $MV1_{CON}$ or $MV2_{CON}$, respectively, then a block 40 adjusts the level of the $OCV_{STPT}$ in a non-optimal, or relaxed, direction by an amount equal to $\Delta s$, wherein $\Delta s$ may be calculated as follows:

$$\Delta S = \min\left[ \frac{-\Delta MV1_{above}}{G_{MV1-OMV}}, \frac{-\Delta MV2_{above}}{G_{MV2-OMV}}, \frac{-\Delta AV_{above}}{G_{AV-OMV}} \right] \quad (1)$$

where $\Delta MV1_{above}$, $MV2_{above}$ and $\Delta AV_{above}$ represent the amounts by which MV1, MV2 and AV exceed $MV1_{CON}$, $MV_{CON}$, and $AV_{CON}$ respectively, and may be determined as follows:

$$\Delta MV1_{above} = MV1_{current} + \Delta MV1 - MV1_{limit} \quad (2)$$

$$\Delta MV2_{above} = MV2_{current} + \Delta MV2 - MV2_{CON} \quad (3)$$

$$\Delta AV_{above} = AV_{current} + \Delta AV_{predicted} - AV_{CON} \quad (4)$$

In equations (2), (3) and (4), $\Delta MV1$ and $\Delta MV2$ represent the amount by which the values of the manipulated variables, MV1 and MV2 (the feed flow rate and the water flow rate), are to be adjusted at one or more future process moves; $MV1_{current}$ and $MV2_{current}$ represent the current values of MV1 and MV2; $AV_{current}$ represents the current value of the auxiliary variable, AV, and $\Delta AV_{predicted}$ represents the predicted value of the auxiliary AV based on the current values of the process variables. In equation (1), $G_{MV1-OMV}$, $G_{MV2-OMV}$ and $G_{AV-OMV}$ represent the gains at the end of the prediction horizon, i.e., the changes that will occur to the feed flow, the water flow and the tank level in response to adjusting the $OCV_{SP}$ one unit value with the process control loop closed (when the IOMPC 12 is operating). As will be described in more detail below, the gains, $G_{MV1-OMV}$, $G_{MV2-OMV}$ and $G_{AV-OMV}$, are automatically determined by the optimizing control logic 14 during configuration of the model predictive controller.

It will be understood that adjusting the level of the $OCV_{SP}$ in a non-optimal direction depends on whether the $OCV_{SP}$ is an increasing setpoint or a decreasing setpoint. More particularly, if the $OCV_{SP}$ is an increasing setpoint, then $\Delta s$ is subtracted from the $OCV_{SP}$ at the block 40 and if the $OCV_{SP}$ is a decreasing setpoint, then $\Delta s$ is added to the $OCV_{SP}$ at the block 40.

After the $OCV_{SP}$ has been adjusted by the block 40, control returns to the block 32 wherein the OMV is relaxed until the OCV has reached the newly adjusted $OCV_{SP}$. Thus, the OMV is maintained at the $OCV_{SP}$ using the control variable OCV and the feedback path 25.

It should be noted that, after the OMV has been relaxed from its optimal setting by the block 34, control continues at the blocks 36 and 38 as describe above. At the block 38, either of $MV1_{FUT}$ or $MV2_{FUT}$ may still be at, or in violation of, its respective constraint limit in which case control again flows to the block 40 and the $OCV_{SP}$ is again adjusted by As in a non-optimal direction. Control continues to loop through the blocks 32–40 until the block 38 determines that neither of $MV1_{FUT}$ nor $MV2_{FUT}$ is at, or in violation of, its respective constraint.

Of course, it will be appreciated by one of ordinary skill in the art that the process 16 never actually enters the undesired state because the optimizing control logic 14 is configured to monitor the predicted future values $MV1_{FUT}$ and $MV2_{FUT}$ and to respond to these predicted future values in a manner that will prevent the manipulated variables MV1 and MV2 from ever reaching or violating their respective constraints, and thereby prevent the process 16 from entering the undesired state. As a result, the IOMPC 12, as configured, is especially robust in its ability to avoid constraint violations before they occur. Moreover, the IOMPC 12 does not react until a future violation is predicted. Therefore, a manipulated variable lying very close to its respective constraint will not unnecessarily cause the system to back off from its optimal mode, thereby allowing the process 16 to operate closer to the process constraints but while still avoiding violations thereof.

If, the block 38 determines that no constraint violations will occur, i.e., neither $MV1_{FUT}$ nor $MV2_{FUT}$ is at or is in violation of its respective constraint, then control proceeds to a block 42 wherein the value of the $OCV_{SP}$ is examined to determine whether $OCV_{SP}$ is set at the $OMV_{CON}$. If the $OCV_{SP}$ is not set at $OMV_{CON}$, then control proceeds to the block 44 wherein the value of the $OCV_{SP}$ is adjusted by a predetermined amount, such as, for example, one or two percent of the process scale, in an optimal direction. Control then returns to the block 32 and the blocks subsequent thereto. As will be understood, if the $OCV_{SP}$ has been adjusted from its optimal setting of $OMV_{CON}$ and if there are no future constraint violations predicted at the block 38, the optimizing control logic 14 will continue to loop through the blocks 32, 34, 36, 38, 42 and 44, wherein the $OCV_{SP}$ is incrementally increased during each pass until it is restored to the value of the $OMV_{CON}$. As a result, the mode of operation wherein the process control continues to loop through the block 32, 34, 36, 38, 42 and 44 may be referred to as a sub-optimal mode of operation because while looping through these blocks, the $OCV_{SP}$ is not set at the optimal value of $OMV_{CON}$ but rather is set at a sub-optimal setting.

If, the block 42 determines that the $OCV_{SP}$ is equal to $OMV_{CON}$, then control returns back to the block 32 and the optimizing control logic 14 continues to loop through the blocks 32, 34, 36, 38 and 42 until it is determined by the block 38 that either of $MV1_{FUT}$ or $MV2_{FUT}$ is in violation of its respective constraints, in which case, control branches to the block 40 and the blocks subsequent thereto, as described above. The mode of operation wherein the process control continues to loop through the blocks 32, 34, 36, 38 and 42 may be referred to as an optimal mode of operation because while executing these blocks, the $OCV_{SP}$ is set at its optimal setting, i.e., $OMV_{CON}$, and thus, the OMV is operating at its maximum setting. Control of the process 16 may continue to loop through the blocks of the flow chart of FIG. 3 in the manner described above for an indefinite amount of time or until an operator shuts the system down.

As described above, conventional model predictive control involves using the process model and the current process variables to predict a future process state and to use this future process state to calculate a set of adjustments to be made to the manipulated variables that will cause the control variables to satisfy their respective setpoints. As a result, a conventional model predictive controller may be configured to perform all of the steps performed during execution of the blocks 30–46, provided of course, that the model predictive controller has been configured to include the OCV related to the OMV by a unit gain (as illustrated in FIG. 1) and provided that the model predictive controller has been configured to control the OCV according to the method represented by the flow diagram of FIG. 3. As a result, the IOMPC 12 performs optimal model predictive control in a manner that may be fully integrated into conventional model predictive control technology and without need of additional control devices.

Figure 4:
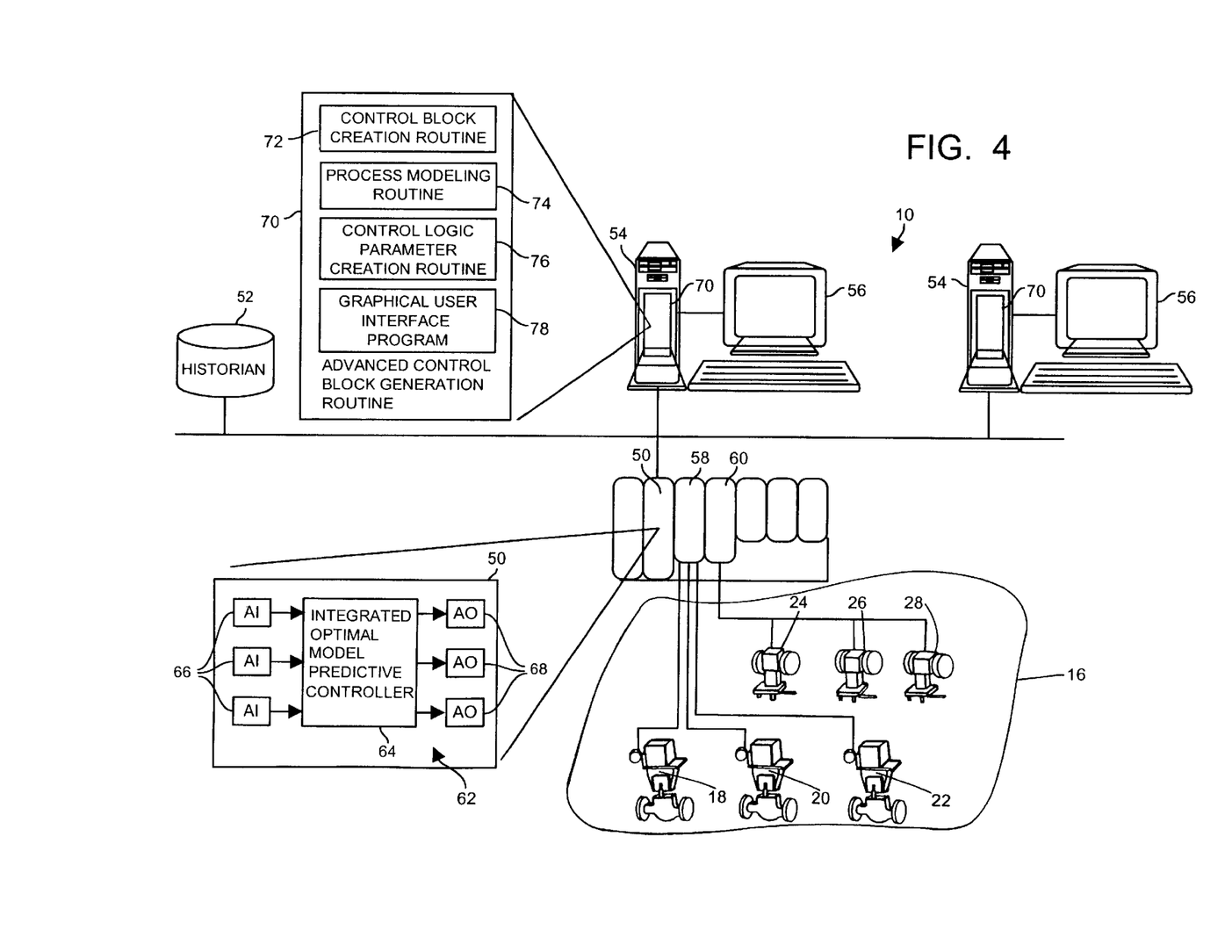
FIG. 4 is a diagram of a process control system having a controller used to implement the integrated optimal model predictive controller of FIG. 1.

Referring now to FIG. 4, the IOMPC 12 of FIG. 1 may implemented using a process controller 50 that is connected to a data historian 52 and to one or more host workstations or computers 54 (which may be any type of personal computers, workstations, etc.), each having a display screen 56. The controller 50 may also be connected to the process control devices 18, 20 and 22 and to the process measuring devices 24, 26 and 28 via input/output (I/O) cards 58 and 60. The data historian 52 may be any desired type of data collection unit having any desired type of memory and any desired or known software, hardware or firmware for storing data and may be separate from (as illustrated in FIG. 4) or a part of one of the workstations 54. The controller 50, which may be, by way of example, the DeltaV™ controller developed/manufactured by Fisher-Rosemount Systems, is communicatively connected to the host computers 54 and the data historian 52 via, for example, an ethernet connection or any other desired communication network. The controller 50 is also communicatively connected to the process control devices 18, 20 and 22 and to the process measuring devices 24, 26 and 28 using any desired hardware and software associated with, for example, standard 4–20 ma devices and/or any smart communication protocol such as the Fieldbus protocol, the HART protocol, etc.

As stated above, although the control system 10 is described with respect to control of the chemical reaction process 16, it may instead be used to control any type of process. In addition, the field devices 18, 20, 22, 24, 26 and 28 may be implemented with any types of devices, such as sensors, valves, transmitters, positioners, etc. and the I/O cards 58 and 60 may be any types of I/O devices conforming to any desired communication or controller protocol. For example, the field devices 18, 20, 22, 24, 26 and 28 may be implemented using standard 4–20 ma devices that communicate over analog lines to the I/O card 58 or may instead be implemented using smart devices, such as Fieldbus field devices, that communicate over a digital bus to the I/O card 58 using Fieldbus protocol communications. In general terms, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein. Of course, the field devices 18, 20, 22, 24, 26 and 28 could conform to any other desired standard(s) or protocols, including any standards or protocols developed in the future.

Referring still to FIG. 4, to control the process 16, the controller 50 may be configured to implement an advanced control loop 62 (which is a multi-input/multi-output control loop) having an advanced control block 64 that receives three analog input signals from a set of analog input (AI) function blocks 66 and that supplies three analog output signals to a set of analog (AO) output function blocks 68. Each of the analog input function blocks 66 are associated with one of the sensors 24, 26 and 28 and each of the analog output function blocks 68 are associated with one of the valves 18, 20, 22. As will be described below, the advanced control block 64 will be configured to perform integrated optimal model predictive control (i.e., to operate as the IOMPC 12 of FIG. 1). In accordance with conventional control system terminology, each of the function blocks represents a part (e.g., a subroutine) of the overall control routine and each function block operates in conjunction with the other function blocks (via communications called links) to implement the process control loop 62 within the process control system 10. Function blocks typically perform one of an input function, such as that associated with a transmitter, a sensor or other process parameter measurement device, a control function, such as that associated with a control routine that performs PID, fuzzy logic, MPC, etc. control, or an output function which controls the operation of some device, such as a valve, to perform some physical function within the process control system 10. The function blocks 66 and 68 are stored in and are executed by the controller 50 but may, alternatively, be stored in and implemented by the field devices 18, 20, 22, 24, 26 and 28.

As illustrated in FIG. 4, one of the workstations 54 includes an advanced control block generation routine 70 that is used to create, download and implement the advanced control block 64 in a manner described in more detail herein. While the advanced control block generation routine 70 may be stored in a memory within the workstation 54 and executed by a processor therein, this routine (or any part thereof) may additionally or alternatively be stored in and executed by other devices within the process control system 10, if so desired. Generally, the advanced control block generation routine 70 includes a control block creation routine 72 that creates the advanced control block 64 and that connects the advanced control block 64 into the process control system, a process modeling routine 74 that creates a process model for the process or a portion thereof based on data collected by the advanced control block 64, and a control logic parameter creation routine 76 that creates control logic parameters for the advanced control block 64 from the process model and that stores or downloads these control logic parameters in the advanced control block 64 for use in controlling the process 16. It will be understood that the routines 72, 74 and 76 can be made up of a series of different routines, such as a first routine that creates an advanced control element having control inputs adapted to receive process outputs and having control outputs adapted to provide control signals to process inputs, a second routine that enables a user to communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that creates a process model from the collected data, a sixth routine that develops advanced control logic parameters from the process model and a seventh routine that places the advanced control logic and, if needed, the process model within the advanced control element to enable the advanced control element to control the process.

The advanced control block generation routine 70 may further include a graphical interface program 78 that allows a user to communicate with the advanced control block generation routine 70 thereby to provide configuration information that is used by the advanced control block generation routine 70 to design and configure the process control system 10 for control of the process 16.

Figure 5:
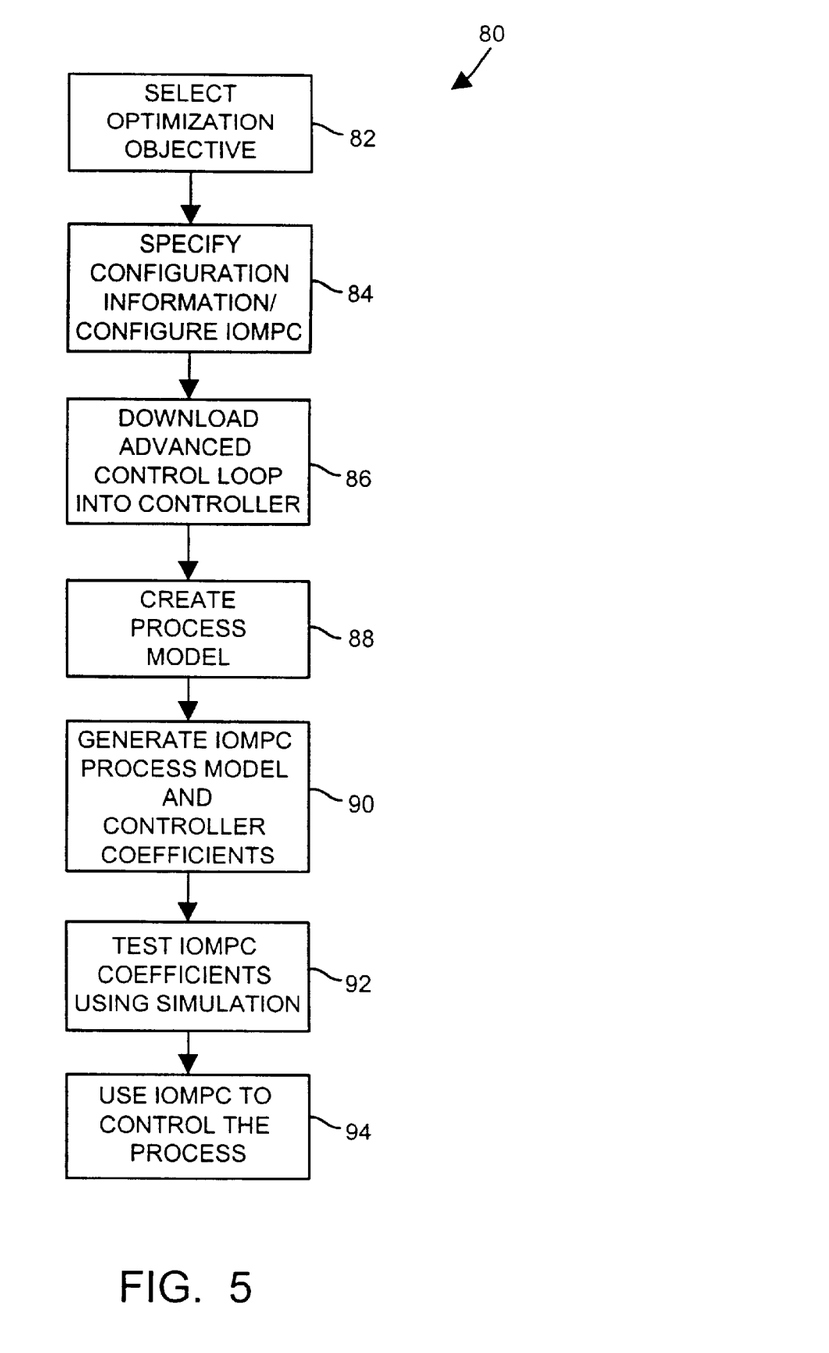
FIG. 5 is a flow diagram illustrating a method of configuring the controller of FIG. 4 to operate as an integrated optimal model predictive controller.

Referring now to FIG. 5, a flowchart 80 illustrates the steps of a method for designing/configuring the advanced control loop 62 to perform integrated optimal model predictive control of the process 16. The method begins at a step 82 wherein the optimization objective is selected. As described above, the optimization objective selected for optimization, in the illustrated example, is the production rate i.e., the process throughput.

Next, at a block 84, the user begins to configure the process control system 10 by supplying configuration information to the control block generation routine 70 via the graphical interface program 78. Preferably, once initiated, the graphical interface program 78 prompts the user to specify the control strategy that will be used to design the control system. As described hereinbefore, a control strategy that uses function blocks may be used to represent the control system 10 in which case, the user responds to the prompt by specifying a function block control strategy. Of course, should the user desire to use an alternative control strategy such as, for example, ladder logic or sequential function charts, then the user would specify the chosen strategy accordingly. After the control strategy has been specified, the graphical interface program 78 may prompt the user to specify the number of function blocks that will be used to implement the process control system 10. For example, with respect to the process 16, the user specifies that the advanced control loop 62 includes the three analog input function blocks 66, the three analog output function blocks 68 and the advanced control block 64. After the number of function blocks has been specified, the graphical program interface 58 may cause the control block creation routine 72 to be initiated. Once initiated, the control block creation routine 72 generates seven control blocks, one to represent each of the six analog input and analog output function blocks 66 and 68 and one to represent the advanced control block 64. During the generation of the control blocks that represent the analog input and output function blocks 66, 68, the control block creation routine 72 prompts the user to specify the manner in which each of the function blocks 66 and 68 is to be coupled to the advanced control block 64 and further prompts the user to specify the function to be performed by each of the function blocks, i.e, that each of the analog input function blocks 66 is associated with one of the sensors 24, 26 and 28 and that each of the analog output function blocks 68 is associated with one of the valves 18, 20 and 22. In addition, the user is prompted to specify any other information necessary to create/configure the function blocks 66, 68 including, for example, the gains, if any, associated with the function blocks 66, 68 and/or any scaling that needs to be performed on the signals generated by the function blocks.

When the control block creation routine 72 is creating the advanced control block 64, the user may further be prompted to specify the control method to be performed by the advanced control block 64. In response, the user specifies that the advanced control block 64 is to be configured to perform integrated optimal model predictive control, i.e., to specify that the advanced control block 64 is to operate as the IOMPC 12 (See FIG. 1). Next, the user is prompted to specify the inputs and outputs associated with the process 16. Referring also to FIG. 1, the process 16 is illustrated as including three inputs X1, X2, X3 which are associated with the positions of the three valves 18, 20 and 22, respectively, and the process further has three outputs Y1, Y2, Y3 which are each associated with the measurements provided by the sensors 24, 26 and 28, respectively. Once the process inputs X1, X2, X3 and the process outputs Y1, Y2, Y3 have been specified, the control block creation routine 72 configures the advanced control block 64 to operate as an IOMPC having three outputs, OUT1, OUT2 and OUT3, that are coupled to the process inputs X1, X2 and X3 and having three inputs IN1, IN2 and IN3 that are coupled to the process outputs Y1, Y2 and Y3.

Referring still FIG. 5, during the step 84 of specifying the configuration, the control block creation routine 72 will cause the graphical interface 78 to prompt the user to identify the OMV. As described above, for the illustrated example it is assumed that the steam flow rate MV3 must be optimized in order to maximize the production rate and, therefore, MV3 is identified to the control block creation routine 72 by the user as the OMV. After the identity of the OMV has been supplied to the control block creation routine 72, the control block creation routine 72 automatically creates an optimized control variable (OCV) that is related to the OMV. In accordance with the description of the OCV provided above, the OCV does not correspond to any of the actual process outputs, i.e., Y1, Y2, Y3, but is instead configured as a control variable that is related to the OMV by a unit gain.

During the step 84, the control block creation routine 72 may further prompt the user to specify the default values of the setpoints $CV1_{SP}$ and $CV2_{SP}$ and to specify the values of the constraints $MV1_{CON}$, $MV2_{CON}$ and $OMV_{CON}$. After having received the value for the $OMV_{CON}$, the control block creation routine 72 creates a setpoint for the OCV, referred to as the $OCV_{SP}$ that is equal to the value of the $OMV_{CON}$.

At the step 84 it may be necessary to additionally specify other logic parameters to the control block creation routine 72 including, for example, the time frame over which control changes are to be made (e.g., the set point trajectory filter time constants), the maximum or minimum movement (rate limit) of an MPC output or a process output, whether any of the controlled parameters are integrated control parameters, IOMPC optimization factors, variables or tuning parameters, the control horizon of the IOMPC control block 64, i.e., how many steps forward manipulate variable values are to be computed to control to a desired state, the engineering unit ranges for each of the inputs and outputs of the IOMPC block 64, which of the controlled variables will be allowed to be relaxed or not realized when one of the constraints is violated, the value of parameters related to the aggressiveness or robustness of the MPC, etc.

Referring still to FIG. 5, next, at a step 86, the advanced control loop 62 configured at the block 84 is automatically downloaded into the controller 50 and the inputs and outputs of the advanced control block 64 are communicatively connected to the appropriate process inputs and outputs. Specifically, as illustrated in FIG. 1, wherein the advanced control block 64 is represented by the IOMPC 12, the process outputs Y1–Y3 are communicatively coupled to the IOMPC inputs IN1–IN3 and the process inputs X1–X3 are communicatively coupled to the IOMPC outputs OUT1–OUT3, respectively. For simplicity, the analog input function block 66 and the analog output function block 68 are omitted from the block diagram of FIG. 1, but are assumed to be coupled to the inputs and outputs of the IOMPC 12. Of course, the user can connect the advanced control block 64 to the process 16 in any desired manner and, generally, will use the same control configuration or design program that the user uses to create other control loops like single-loop control routines within the process control system 10. For example, the user may use any desired graphical programming routine to specify the connections between the advanced control block 64 and the process inputs and outputs. In this manner, the advanced control block 64 is supported in the same manner as other control blocks, elements or routines, which makes configuration and connection of the advanced control block 64 and support of that block within the control system 10 no different than the configuration, connection and support of the other blocks within the system. In one embodiment, the advanced control block 64, as well as the other blocks within the control system 10, are function blocks designed to be the same as or similar to Fieldbus function blocks. In this embodiment, the advanced control block 64 may have the same or similar types of inputs, outputs, etc. as specified or provided in the Fieldbus protocol and is capable of being implemented by, for example, the controller 50 using communication links which are the same as or similar to those specified by the Fieldbus protocol. A method of graphically creating process control routines and elements thereof is described in Dove et al., U.S. Pat. No. 5,838,563 entitled "System for Configuring a Process Control Environment" which is hereby expressly incorporated by reference herein. Of course, other control loop or control module design strategies could be used as well, including those which use other types of function blocks or which use other routines, sub-routines or control elements within a process control configuration paradigm.

As illustrated in FIG. 1, the advanced control block 64 downloaded into the controller 50 at the step 86 (see FIG. 5) may include a data collection routine 100, which may alternatively be stored in the data historian 52, a waveform generator 101, generic control logic 102, storage 103 for storing control parameters and a process model 104. The generic logic 102 may be, for example, a generic MPC routine that needs coefficients or other control parameters to perform control in a particular instance. In some cases, the generic logic 102 may also need a process model for the process being controlled.

Referring again to FIG. 5, after the advanced control block 64 has been downloaded to the controller at the step 86, the step 88 is performed wherein the advanced control block 64 is instructed, via the process modeling routine 74, to begin the next phase of development of the advanced control block 64 in which data is collected for each of the process outputs for use in creating a process model. In particular, when instructed to do so by the user (or at any other desired time), the waveform generator 101 of the advanced control block 64 begins to produce a series of waveforms at the outputs $OUT_1$–$OUT_3$ thereof so as to provide excitation waveforms to each of the process inputs $X_1$–$X_3$. If desired, these waveforms may be provided to the generator 101 by software within the user workstation 54 but, are preferably created by the generator 101. The waveforms generated by the waveform generator 101 are preferably designed to cause the process 16 to operate over the different ranges of inputs expected during normal operation of the process. For proper design of the advanced control block 64, the input waveforms supplied to the process inputs, IN1, IN2 and IN3 should correspond to the flow rates of the feed material, the water and the steam, respectively, instead of the positions of the valves 18, 20 and 22. Thus, if not already known, it will be necessary to calculate the flow rates corresponding to the various valve positions and to supply these rates to the IOMPC creation routine 72.

The waveform generator 101 may deliver to each of the process inputs $X_1$–$X_3$, a series of different sets of pulses, wherein the pulses within each of the sets of pulses have the same amplitude but have pseudo-random lengths and wherein the pulses within the different sets of pulses have different amplitudes. The set of pulses may be created for and then delivered to each of the different process inputs $X_1$–$X_3$ sequentially, one at a time. During this time, the data collection unit 100 within the advanced control block 64 collects or otherwise coordinates the collection data indicating the response of the process outputs $Y_1$–$Y_3$ to each of the waveforms generated by the waveform generator 101 and may collect or coordinate the collection of data pertaining to the excitation waveform being generated. This data may be stored in the advanced control block 64 but, preferably, is automatically sent to the data historian 52 for storage and/or to the workstation 54 where this data may be displayed on the display screen 56.

In this manner, the advanced control block 64 provides a set of excitation waveforms to the process 16 and measures the response of the process 16 to these excitation waveforms. Of course, the excitation waveforms generated by the waveform generator 101 may be any desired waveforms that are known to be useful in developing a process model for a model predictive controller, and these waveforms may take any form now known or developed in the future for this purpose. Because waveforms used to excite a process for the purpose of collecting data to develop a process model for model predictive control are well known, these waveforms will not be described further herein.

It should be noted that the waveform generator 101 may take any desired form and may, for example, be implemented in hardware, software or a combination of both. If implemented in software, the waveform generator 101 may store an algorithm that can be used to generate the desired waveforms, may store digital representations of the waveforms to be generated, or may use any other routine or stored data to create such waveforms. If implemented in hardware, the waveform generator 101 may take the form of, for example, a square wave generator. If desired, the user may be asked to input certain parameters needed to design the waveforms, such as the approximate response time of the process, the step size of the amplitude of the waveforms to be delivered to the process inputs, etc. The user may be prompted for this information when the advanced control block 64 is first created or when the user instructs the advanced control block 64 to begin to upset or excite the process and collect process data.

In a preferred embodiment, the data collection unit 100 collects (or otherwise assures the collection of) data in response to each of the excitation waveforms at three to five times the response time for a single output process and up to 10 or more times the response time for a multivariable process to assure that a complete and accurate process model may be developed. However, data may be collected for any other amount of time. In any event, the advanced control block 64 preferably operates until the waveform generator 101 has completed delivering all of the necessary excitation waveforms to each of the process inputs $X_1$–$X_3$ and the data collection unit 100 has collected data for the process outputs $Y_1$–$Y_3$. Of course, the operation of the advanced control block 64 may be interrupted if so desired or if necessary during this data collection process.

Referring still to the step 88 of FIG. 5, after the excitation data has been collected, it is used to generate the process model. The process model may be generated using any known type of process modeling analysis and the developed process model may take on any form, such as a mathematical algorithm, a series of response curves, etc. Because the quality of the process model generated is dependent upon the quality of the excitation data collected, data screening is generally performed before generating the process model to remove outliers and other unreliable data points from the data set. The process model that is generated may be automatically saved in any desired database to be accessible for later use.

Once the process model has been created, the control logic parameter creation routine 76 is executed at a step 90 to thereby generate a set of IOMPC process model coefficients/controller coefficients or control logic parameters. The control logic parameters, which will be used by the advanced control block 64 to control the process 16, are generated by inverting the matrix that represents the process model. The specifics of creating a process model from collected data for a process and generating MPC or other control logic parameters from that process model by inverting the matrix of collected data is known in the art, and, therefore, these procedures are not described further herein. It will be understood that, although the process used to generate the logic parameters described herein involves inverting the process model matrix, any other desired logic parameter creation routine could instead be used.

Referring still to FIG. 5, after the IOMPC control logic parameters have been created, the IOMPC control logic parameters or coefficients may be tested, at a step 92, using a process simulation block. This simulation block may generally be developed from the process model created for the process and can be connected to the advanced control block 64 in a testing environment to test whether the created IOMPC control logic operates satisfactorily over the range of normal process operation. If the IOMPC logic is not satisfactory, any or all of the steps 86, 88 and 90 may be repeated to develop different IOMPC control logic. However, if the IOMPC control logic is satisfactory, the IOMPC control logic parameters and the process model stored in the parameter storage 103 and the process model storage 104 are used by the advanced control block 64 at a step 94 to control the process 16. In this manner, the parameters needed by the IOMPC control logic are provided to and contained within the advanced control block 64 and the advanced control block 64 can be commissioned to actually perform control as the IOMPC 12 within the process according to the IOMPC control logic 102. Of course, if desired, the actual IOMPC logic 102 along with the parameters needed therefor can be created in the workstation 54 and downloaded to the IOMPC block 64.

Certain modifications may occur to one of ordinary skill in the art. For example, the IOMPC 12 may be configured to optimize more than one optimization objective in which case two or more manipulated variables, depending on the number of optimization objectives, are identified for optimization. More particularly, if it is desirable to optimize both product throughput and product cost (i.e., to maximize throughput and minimize cost), then the manipulated variables that are used to optimize these characteristics (i.e., the manipulated variables that have the greatest impact on these characteristics) are identified. Next, a separate optimizing control variable is assigned for each optimized manipulated variable and the IOMPC is configured such that each of the OMVs is tied to its respective OCV by a unit gain. The IOMPC may be programmed to manage the OMVs in an identical fashion or on a priority basis. Specifically, when operating the process in an optimal manner, wherein the OMVs are operating at their optimal levels, and when a future value of a manipulated variable, other than the OMVs, exceeds its respective constraint, the IOMPC may be programmed to cause both OMVs to depart from their optimal values simultaneously. Alternatively, the OMVs may be assigned priorities such that, in the event of an exceeded constraint, the IOMPC causes the OMVs to depart from their optimal values in an order that is based on their assigned priority.

Of course it will be understood that the number of manipulated variables that must reach or exceed their respective constraints in order for the process to enter the undesired state is dependent upon the number of process input variables associated with the process. Specifically, the number of process input variables define the degrees of freedom for a process control system and the greater the number of degrees of freedom, the greater the number of manipulated variables that may operate at or in violation of their respective constraints without causing the process to enter the desired state. Thus, although, as described with reference to the process 16 shown in FIG. 2, an undesired state occurs when two or more of the manipulated variables (including the OMV) reach or exceed their respective constraint limits, a process having a greater number of process input variables may be able to operate with a greater number of manipulated variables at or in excess of their respective constraint limits without entering the undesired state.

Further, the method represented by the blocks 30–44 in FIG. 3 may instead be implemented using a fuzzy logic controller to perform integrated optimal fuzzy logic control.

It should also be noted that, when implemented, any of the software described herein may be stored in any computer readable memory such as on a magnetic disk, a laser disk, or other storage medium, in a RAM or ROM of a computer or processor, etc. Likewise, this software may be delivered to a user, a process control system or the computer via any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or may be modulated using any suitable modulation carrier wave before being transmitted over a communication channel.

It should further be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this invention, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A multi-input/multi-output logic device for use in controlling a process comprising:
    a plurality of inputs adapted to receive process output signals;
    a further input having an associated setpoint;
    a multiplicity of outputs adapted to provide process control signals for controlling the process;
    a feedback path that connects a selected one of the outputs to the further input;
    a logic unit configured to produce the multiplicity of outputs using the plurality of inputs and the further input and adapted to adjust the selected output until the further input has reached the associated setpoint; and
    wherein each of the multiplicity of outputs has an associated constraint limit, and wherein the logic unit comprises a prediction unit adapted to predict a future value for each of the multiplicity of outputs and a comparison unit adapted to compare the future value for each of the multiplicity of outputs to the constraint limit associated with that output to determine whether any one of the outputs, other than the selected output, is going to reach or exceed the associated constraint limit for that output.

2. The logic device of claim 1, wherein the logic unit is a model predictive controller.

3. The logic device of claim 1, wherein the logic unit is a fuzzy logic controller.

4. The logic device of claim 1, wherein the setpoint is associated with a constraint limit for the selected output.

5. The logic device of claim 1, wherein each of the multiplicity of outputs has an associated constraint limit, and wherein the logic unit further comprises a setpoint adjustment unit adapted to adjust the setpoint from a first setpoint setting to a second setpoint setting when one of the outputs, other than the selected output, is going to reach or exceed the associated constraint limit for that output.

6. The logic device of claim 5, wherein the first setpoint setting is a value that is equal to the constraint limit of the selected output and wherein the second setpoint setting is a value that is relaxed with respect to the constraint limit of the selected output.

7. The logic device of claim 5, wherein the setpoint adjustment unit is further adapted to adjust the setpoint from the second setpoint setting to the first setpoint setting when the one of the outputs is no longer going to reach or exceed the constraint limit associated with that output.

8. The logic device of claim 7, wherein the setpoint adjustment unit is further adapted to adjust the setpoint from the second setpoint setting to the first setpoint setting in a series of step-wise adjustments.

9. The logic device of claim 1, wherein the logic unit further comprises a setpoint adjustment unit adapted to adjust the setpoint from a first setpoint setting to a second setpoint setting when one of the outputs, other than the selected output, is going to reach or exceed the associated constraint limit for that output, wherein the first setpoint setting is a value that is equal to the constraint limit of the selected output and wherein the second setpoint setting is a value that is relaxed with respect to the constraint limit of the selected output.

10. The logic device of claim 9, wherein the setpoint adjustment unit is further adapted to continue adjusting the setpoint in a relaxed direction relative to the second setpoint setting when the one of the outputs, other than the selected output, is still going to reach or exceed the associated constraint limit for that output, when the setpoint is at the second setpoint setting.

11. The logic device of claim 9, wherein the setpoint adjustment unit is further adapted to adjust the setpoint from the second setpoint setting to the first setpoint setting when the one of the outputs, other than the selected output, is no longer going to reach or exceed the associated constraint limit for that output.

12. The logic device of claim 11, wherein the setpoint adjustment unit is further adapted to adjust the setpoint from the second setpoint setting to the first setpoint setting in a series of step-wise adjustments.

13. The logic device of claim 9, wherein the further input comprises a first further input, the associated setpoint comprises a first setpoint, the feedback path comprises a first feedback path and the selected output comprises a first selected output and wherein the logic device further comprises a second further input having a second setpoint, and a second feedback path that directly connects a second selected output to the second further input, wherein the setpoint adjustment unit is further adapted to change the second setpoint from a third setpoint setting to a fourth setpoint setting when the one of the outputs, other than the selected output, is going to reach or exceed the associated constraint limit for that output, wherein the third setpoint setting is the constraint limit of the second selected output and the fourth setpoint setting is relaxed with respect to the constraint limit of the second selected output.

14. The logic device of claim 13, wherein the first setpoint and the second setpoint each have a priority level and wherein the setpoint adjustment unit is further adapted to adjust the first setpoint and the second setpoint in an order according to the priority level of the first setpoint and the second setpoint.

15. The logic device of claim 13, wherein the setpoint adjustment unit is further adapted to adjust the first setpoint and the second setpoint simultaneously.

16. The logic device of claim 1, wherein the feedback path includes an amplifier.

17. The logic device of claim 16, wherein the amplifier has a unit gain.

18. A multi-input/multi-output logic device for use in controlling a process comprising:
   a plurality of inputs adapted to receive process output signals;
   a further input having an associated setpoint;
   a multiplicity of outputs adapted to provide process control signals for controlling the process;
   a feedback path that connects a selected one of the outputs to the further input;
   a logic unit configured to produce the multiplicity of outputs using the plurality of inputs and the further input and adapted to use the feedback path to control the selected output to be equal to the setpoint; and
   wherein each of the multiplicity of outputs has an associated constraint limit, and wherein the logic unit comprises a prediction unit adapted to predict a future value for each of the multiplicity of outputs and a comparison unit adapted to compare the future value for each of the multiplicity of outputs to the constraint limit associated with that output to determine whether any one of the outputs, other than the selected output, is going to reach or exceed the associated constraint limit for that output.

19. The logic device of claim 18, and wherein the logic unit comprises a setpoint adjustment unit adapted to adjust the setpoint when one of the outputs, other than the selected output, is going to reach or exceed the associated constraint limit for that output.

20. The logic device of claim 19, wherein the logic unit comprises a model predictive controller.

21. A multi-input/multi-output logic device for use in controlling a process comprising:
   a plurality of inputs adapted to receive process output signals;
   a further input having an associated setpoint;
   a multiplicity of outputs adapted to provide process control signals for controlling the process, wherein each of the multiplicity of outputs has an associated constraint limit;
   a feedback path that connects a selected one of the outputs to the further input;
   a logic unit configured to produce the multiplicity of outputs using the plurality of inputs and the further input and including a setpoint adjustment unit adapted to change the setpoint when one of the outputs, other than the selected output, is going to reach or exceed the associated constraint limit for that output; and
   wherein the logic unit comprises a prediction unit adapted to predict a future value for each of the multiplicity of outputs and a comparison unit adapted to compare the future value for each of the multiplicity of outputs to the constraint limit associated with that output to determine whether any one of the outputs, other than the selected output, is going to reach or exceed the associated constraint limit for that output.

22. A method for controlling a process using a multi-input/multi-output logic device having a plurality of inputs adapted to receive process output signals and a multiplicity of outputs adapted to provide process control signals for controlling the process, wherein each of the outputs has an associated constraint limit, the method comprising the steps of:

connecting a selected one of the outputs to a further input of the logic device;

setting a setpoint associated with the further input to a first setpoint setting;

adjusting the selected output until the further input has reached the first setpoint setting;

calculating a future value for each of the multiplicity of outputs other than the selected output;

comparing the future value calculated for each of the multiplicity of outputs, other than the selected output, to the associated constraint limit for that output to determine whether any one of the outputs, other than the selected output, is going to reach or exceed the associated constraint limit for that output; and adjusting the setpoint from the first setpoint setting to a second setpoint setting when the step of comparing determines that one of the outputs, other than the selected output, is going to reach or exceed the associated constraint limit for that output.

23. The method of claim 22, wherein the first setpoint setting is equal to a constraint limit of the selected output, and wherein the second setpoint setting is equal to a value that is relaxed relative to the constraint limit of the selected output.

24. The method of claim 22, further including the step of adjusting the setpoint from the second setpoint setting to the first setpoint setting when the step of comparing determines that the one of the outputs is no longer going to reach or exceed the associated constraint limit for that output.

25. The method of claim 22, further including the step of further adjusting the setpoint in a direction that is relaxed relative to the second setpoint setting when the step of comparing determines that the one of the outputs, other than the selected output, is still going to reach or exceed the associated constraint limit for that output, when the setpoint is set to the second setpoint setting.

26. The method of claim 22, further including the step of calculating the multiplicity of outputs from the plurality of inputs and the further input using a model predictive control technique.

27. The method of claim 22, further including the step of calculating the multiplicity of outputs from the plurality of inputs and the further input using a fuzzy logic control technique.

28. The method of claim 22, wherein the further input comprises a first further input, the associated setpoint comprises a first setpoint, and the selected output comprises a first selected output, and wherein the method further comprises the steps of;

connecting a second selected one of the outputs to a second further input;

setting a second setpoint associated with the second further input to a third setpoint setting;

adjusting the second selected output until the second further input has reached the third setpoint setting;

adjusting the second setpoint from the third setpoint setting to a fourth setpoint setting when the step of comparing determines that the one of the outputs, other than the selected output, is going to reach or exceed the associated constraint limit for that output; and adjusting the setpoint from the fourth setpoint setting to the third setpoint setting when the step of comparing determines that the one of the outputs, other than the selected output, is no longer going to reach or exceed the associated constraint limit for that output.

29. The method of claim 28, further comprising the steps of;

assigning each of the first setpoint and the second setpoint a priority level, and performing the adjustments to each of the first setpoint and the second setpoint in an order according to the priority level assigned to the first setpoint and the second setpoint.

* * * * *

UNITED STATES PATENT AND TRADEMARK OFFICE
CERTIFICATE OF CORRECTION

PATENT NO. : 6,721,609 B1
DATED : April 13, 2004
INVENTOR(S) : Wilhelm K. Wojsznis et al.

It is certified that error appears in the above-identified patent and that said Letters Patent is hereby corrected as shown below:

Column 4,
Line 28, please delete "a a" and insert -- a --

Column 9,
Line 19, please delete "$CV1_{sp}$" and insert -- $CV2_{sp}$ --

Column 10,
Line 41, please delete "MV2" and insert -- $\Delta MV2$ --

Column 11,
Line 18, please delete "As" and insert -- $\Delta s$ --

Signed and Sealed this

Twenty-sixth Day of April, 2005

JON W. DUDAS
*Director of the United States Patent and Trademark Office*